(12) United States Patent
McCarthy et al.

(10) Patent No.: US 8,867,132 B2
(45) Date of Patent: Oct. 21, 2014

(54) THERMOCHROMIC FILTERS AND STOPBAND FILTERS FOR USE WITH SAME

(75) Inventors: Wil McCarthy, Lakewood, CO (US); Richard M. Powers, Lakewood, CO (US)

(73) Assignee: Ravenbrick LLC, Denver, CO (US)

( * ) Notice: Subject to any disclaimer, the term of this patent is extended or adjusted under 35 U.S.C. 154(b) by 686 days.

(21) Appl. No.: 12/916,233

(22) Filed: Oct. 29, 2010

(65) Prior Publication Data

US 2011/0102878 A1    May 5, 2011

Related U.S. Application Data

(60) Provisional application No. 61/256,853, filed on Oct. 30, 2009.

(51) Int. Cl.
| | |
|---|---|
| *G02B 5/30* | (2006.01) |
| *G02B 27/28* | (2006.01) |
| *G02F 1/1335* | (2006.01) |

(52) U.S. Cl.
USPC ...... 359/489.04; 359/359; 359/360; 359/361; 359/484.01; 359/485.01; 359/485.03; 359/488.01; 359/489.19; 359/492.01; 359/592; 359/597; 359/614; 359/885; 349/16; 349/18; 349/96; 349/104; 349/105; 349/113; 349/161

(58) Field of Classification Search
USPC .......... 349/16, 18, 84, 85, 96, 104–106, 113, 349/161; 359/275, 288, 289, 352, 353, 359/359–361, 483.04, 484.01, 484.08, 359/485.01, 485.03, 488.01, 359/489.01–489.04, 489.19, 492.01, 592, 359/597, 614, 885, 890

See application file for complete search history.

(56) References Cited

U.S. PATENT DOCUMENTS

| | | |
|---|---|---|
| 3,990,784 A | 11/1976 | Gelber |
| 4,006,730 A | 2/1977 | Clapham et al. |
| 4,155,895 A | 5/1979 | Rohowetz et al. |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |
| 4,579,638 A | 4/1986 | Scherber |
| 4,640,583 A | 2/1987 | Hoshikawa et al. |

(Continued)

FOREIGN PATENT DOCUMENTS

| | | |
|---|---|---|
| CN | 1189224 A | 7/1998 |
| CN | 1350648 | 5/2002 |

(Continued)

OTHER PUBLICATIONS

Fan, et al., "Thin-film conducting microgrids as transparent heat mirrors", Appl. Phys. Lett., vol. 28, No. 8, Apr. 5, 1976, 440-442.

(Continued)

*Primary Examiner* — Evelyn A. Lester
(74) *Attorney, Agent, or Firm* — Dorsey & Whitney LLP

(57) ABSTRACT

Thermochromic filters use combinations of absorptive, reflective, thermoabsorptive, and thermoreflective elements covering different portions of the solar spectrum, to achieve different levels of energy savings, throw, shading, visible light transmission, and comfort. Embodiments include stopband filters in the near-infrared spectrum.

26 Claims, 9 Drawing Sheets

(56) References Cited

U.S. PATENT DOCUMENTS

| | | |
|---|---|---|
| 4,641,922 A | 2/1987 | Jacob |
| 4,688,900 A | 8/1987 | Doane et al. |
| 4,688,901 A | 8/1987 | Albert |
| 4,755,673 A | 7/1988 | Pollack et al. |
| 4,756,758 A | 7/1988 | Lent et al. |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,859,994 A | 8/1989 | Zola et al. |
| 4,871,220 A | 10/1989 | Kohin |
| 4,877,675 A | 10/1989 | Falicoff et al. |
| 4,893,902 A | 1/1990 | Baughman et al. |
| 4,899,503 A | 2/1990 | Baughman et al. |
| 4,964,251 A | 10/1990 | Baughman et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,132,147 A | 7/1992 | Takiguchi et al. |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,212,584 A | 5/1993 | Chung |
| 5,227,115 A | 7/1993 | Harnischfeger |
| 5,274,246 A | 12/1993 | Hopkins |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai |
| 5,377,042 A | 12/1994 | Chahroudt |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,640 A | 12/1996 | Huston |
| 5,757,828 A | 5/1998 | Ouchi |
| 5,763,307 A | 6/1998 | Wang |
| 5,881,200 A | 3/1999 | Burt |
| 5,889,288 A | 3/1999 | Futatsugi |
| 5,897,957 A | 4/1999 | Goodman |
| 5,937,295 A | 8/1999 | Chen |
| 5,940,150 A | 8/1999 | Faris et al. |
| 6,040,859 A | 3/2000 | Takahashi |
| 6,055,089 A | 4/2000 | Schulz et al. |
| 6,099,758 A | 8/2000 | Verrall et al. |
| 6,122,103 A | 9/2000 | Perkins et al. |
| 6,208,463 B1 | 3/2001 | Hansen |
| 6,218,018 B1 | 4/2001 | McKown et al. |
| 6,226,067 B1 | 5/2001 | Nishiguchi et al. |
| 6,240,114 B1 | 5/2001 | Anselm |
| 6,260,414 B1 | 7/2001 | Brown et al. |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee |
| 6,320,220 B1 | 11/2001 | Watanabe |
| 6,329,668 B1 | 12/2001 | Razeghi |
| 6,333,516 B1 | 12/2001 | Katoh |
| 6,381,068 B1 | 4/2002 | Harada |
| 6,437,361 B1 | 8/2002 | Matsuda |
| 6,446,402 B1 | 9/2002 | Byker |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson |
| 6,500,555 B1 | 12/2002 | Khaldi |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz |
| 6,611,640 B2 | 8/2003 | LoCasclo |
| 6,635,898 B2 | 10/2003 | Williams et al. |
| 6,661,022 B2 | 12/2003 | Morie |
| 6,671,008 B1 | 12/2003 | Li et al. |
| 6,710,823 B2 | 3/2004 | Faris et al. |
| 6,718,086 B1 | 4/2004 | Ford |
| 6,730,909 B2 | 5/2004 | Butler |
| 6,753,273 B2 | 6/2004 | Holonyak, Jr. et al. |
| 6,770,916 B2 | 8/2004 | Ohshima |
| 6,777,718 B2 | 8/2004 | Takagi |
| 6,816,525 B2 | 11/2004 | Stintz |
| 6,847,662 B2 | 1/2005 | Bouda |
| 6,859,114 B2 | 2/2005 | Eleftheriades |
| 6,912,018 B2 | 6/2005 | Faris et al. |
| 6,926,952 B1 | 8/2005 | Weber et al. |
| 6,933,812 B2 | 8/2005 | Sarabandi |
| 6,946,697 B2 | 9/2005 | Pietambaram |
| 6,963,435 B2 | 11/2005 | Mallya et al. |
| 6,965,420 B2 | 11/2005 | Li et al. |
| 6,978,070 B1 | 12/2005 | McCarthy et al. |
| 6,985,291 B2 | 1/2006 | Watson |
| 6,992,822 B2 | 1/2006 | Ma et al. |
| 7,026,641 B2 | 4/2006 | Mohseni |
| 7,038,745 B2 | 5/2006 | Weber et al. |
| 7,042,615 B2 | 5/2006 | Richardson |
| 7,046,441 B2 | 5/2006 | Huang |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |
| 7,245,431 B2 | 7/2007 | Watson et al. |
| 7,276,432 B2 | 10/2007 | McCarthy et al. |
| 7,300,167 B2 | 11/2007 | Fernando et al. |
| 7,306,833 B2 | 12/2007 | Martin et al. |
| 7,318,651 B2 | 1/2008 | Chua |
| 7,351,346 B2 | 4/2008 | Little |
| 7,385,659 B2 | 6/2008 | Kotchick et al. |
| 7,470,925 B2 | 12/2008 | Tamura |
| 7,522,124 B2 | 4/2009 | Smith |
| 7,532,397 B2 | 5/2009 | Tanaka |
| 7,538,946 B2 | 5/2009 | Smith |
| 7,561,332 B2 | 7/2009 | Little et al. |
| 7,619,816 B2 | 11/2009 | Deng |
| 7,655,942 B2 | 2/2010 | McCarthy et al. |
| 7,755,829 B2 | 7/2010 | Powers et al. |
| 7,768,693 B2 | 8/2010 | McCarthy et al. |
| 7,911,563 B2 | 3/2011 | Hung |
| 8,072,672 B2 | 12/2011 | Powers et al. |
| 8,076,661 B2 | 12/2011 | McCarthy et al. |
| 8,271,241 B2 | 9/2012 | Akyurtlu |
| 8,593,581 B2 * | 11/2013 | McCarthy et al. ............... 349/16 |
| 2002/0079485 A1 | 6/2002 | Stintz et al. |
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris |
| 2002/0141029 A1 | 10/2002 | Carlson |
| 2002/0152191 A1 | 10/2002 | Hollenberg |
| 2002/0180916 A1 | 12/2002 | Schadt et al. |
| 2002/0190249 A1 | 12/2002 | Williams |
| 2003/0059998 A1 | 3/2003 | Holonyak, Jr. |
| 2003/0066998 A1 | 4/2003 | Lee |
| 2003/0107813 A1 | 6/2003 | Clabburn et al. |
| 2003/0107927 A1 | 6/2003 | Yerushalmi |
| 2003/0129247 A1 | 7/2003 | Ju et al. |
| 2003/0138209 A1 | 7/2003 | Chan |
| 2003/0160292 A1 | 8/2003 | Takagi |
| 2003/0214632 A1 | 11/2003 | Ma |
| 2003/0218712 A1 | 11/2003 | Kumar et al. |
| 2003/0227663 A1 | 12/2003 | Agrawal |
| 2004/0005451 A1 | 1/2004 | Kretman et al. |
| 2004/0012749 A1 | 1/2004 | Freeman |
| 2004/0036993 A1 | 2/2004 | Tin |
| 2004/0256612 A1 | 12/2004 | Mohseni |
| 2005/0068629 A1 | 3/2005 | Fernando et al. |
| 2005/0185125 A1 | 8/2005 | Miyachi |
| 2005/0221128 A1 | 10/2005 | Kochergin |

(56) References Cited

U.S. PATENT DOCUMENTS

| | | |
|---|---|---|
| 2005/0271092 A1 | 12/2005 | Ledentsov |
| 2006/0011904 A1 | 1/2006 | Snyder et al. |
| 2006/0118514 A1 | 6/2006 | Little et al. |
| 2006/0147810 A1 | 7/2006 | Koch |
| 2006/0151775 A1 | 7/2006 | Hollenberg |
| 2006/0257090 A1 | 11/2006 | Podolskiy |
| 2006/0262398 A1 | 11/2006 | Sangu et al. |
| 2006/0274218 A1 | 12/2006 | Xue |
| 2007/0070276 A1 | 3/2007 | Tan |
| 2007/0121034 A1 | 5/2007 | Ouderkirk |
| 2007/0215843 A1 | 9/2007 | Soukoulis et al. |
| 2007/0279727 A1 | 12/2007 | Gandhi |
| 2008/0008857 A1* | 1/2008 | Kalkanoglu et al. .......... 428/143 |
| 2008/0013174 A1 | 1/2008 | Allen et al. |
| 2008/0061222 A1 | 3/2008 | Powers et al. |
| 2008/0117500 A1 | 5/2008 | Narendran et al. |
| 2008/0138543 A1 | 6/2008 | Hoshino et al. |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128893 A1 | 5/2009 | McCarthy et al. |
| 2009/0128907 A1 | 5/2009 | Takahashi et al. |
| 2009/0167971 A1 | 7/2009 | Powers et al. |
| 2009/0219603 A1 | 9/2009 | Xue |
| 2009/0266394 A1 | 10/2009 | Tsubone |
| 2009/0268273 A1 | 10/2009 | Powers et al. |
| 2009/0296190 A1 | 12/2009 | Anderson et al. |
| 2010/0001008 A1 | 1/2010 | McCarthy et al. |
| 2010/0015363 A1 | 1/2010 | Chiang et al. |
| 2010/0027099 A1 | 2/2010 | McCarthy et al. |
| 2010/0045924 A1 | 2/2010 | Powers et al. |
| 2010/0051898 A1 | 3/2010 | Kim, II |
| 2010/0060844 A1 | 3/2010 | Sawatari et al. |
| 2010/0118380 A1 | 5/2010 | Xue |
| 2010/0232017 A1 | 9/2010 | McCarthy et al. |
| 2010/0259698 A1 | 10/2010 | Powers et al. |
| 2010/0271686 A1 | 10/2010 | Powers et al. |
| 2010/0288947 A1 | 11/2010 | McCarthy et al. |
| 2011/0025934 A1 | 2/2011 | McCarthy et al. |
| 2011/0044061 A1 | 2/2011 | Santoro et al. |
| 2011/0102878 A1 | 5/2011 | McCarthy et al. |
| 2011/0216254 A1 | 9/2011 | McCarthy et al. |
| 2011/0234944 A1 | 9/2011 | Powers et al. |
| 2011/0292488 A1 | 12/2011 | McCarthy |

FOREIGN PATENT DOCUMENTS

| | | |
|---|---|---|
| CN | 1494091 | 5/2004 |
| EP | 1162496 | 12/2001 |
| GB | 2261989 | 6/1993 |
| JP | 49-94145 | 6/1974 |
| JP | 58 10717 A | 1/1983 |
| JP | 59-231516 | 12/1984 |
| JP | 61223719 | 10/1986 |
| JP | 1178517 A | 7/1989 |
| JP | 02-089426 | 3/1990 |
| JP | 05-147983 | 6/1993 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004-012818 | 1/2004 |
| JP | 2004-291345 | 10/2004 |
| JP | 2005-250119 | 9/2005 |
| JP | 2006-243485 | 9/2006 |
| JP | 2006-285242 | 10/2006 |
| JP | 2007-515661 | 6/2007 |
| JP | 2007-272016 | 10/2007 |
| JP | 2008-530766 | 8/2008 |
| KR | 2002-0044153 | 6/2002 |
| KR | 2003-0072578 | 9/2003 |
| KR | 1020040048916 | 6/2004 |
| KR | 10-2004-0108816 | 12/2004 |
| KR | 1020060000059 | 1/2006 |
| KR | 10-2007-0091314 | 9/2007 |
| KR | 10-2010-0039401 | 4/2010 |
| WO | 94/02313 | 2/1994 |
| WO | WO-9701789 A2 | 1/1997 |
| WO | 01/23173 | 4/2001 |
| WO | 02/064937 | 8/2002 |
| WO | WO-03029885 A1 | 4/2003 |
| WO | 03/096105 | 11/2003 |
| WO | 2005/031437 | 4/2005 |
| WO | WO-2006023195 A2 | 3/2006 |
| WO | 2006/088369 | 8/2006 |
| WO | WO-2008092038 A1 | 7/2008 |
| WO | WO-2008106596 A1 | 9/2008 |
| WO | 2008/144217 | 11/2008 |

OTHER PUBLICATIONS

Iyer, "Negative-Refraction Metamaterials: Fundamental Principles and Applications", IEEE Press, John Wiley & Sons, Chapter 1, 2005, 4-5, 16-30, 321-330.

Author Unknown, "Liquid Crystal Research", http://chirality.swarthmore.edu, printed Aug. 21, 2009.

Barbagallo, S., et al., "Synthesis of novel metamaterials," Chapter 2 (VDM Verlag 2008).

Eleftheriades, G.V., et al. (Editors); Iyers, "Negative-Refraction Metamaterials," Chapter 1 (Wiley 2005), pp. 4-5, 16-30, 321-330.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997), pp. 521-533.

Hao, J. et al., "Manipulating Electromagnetic Wave Polarizations by Anisotropic Metamaterials," Physical Review Letters, 2007, vol. 99, No. 063908.

Harrison, "Quantum Wells, Wires, and Dots: Theoretical & Computational Physics of Semiconductor Nanostructures" 2nd Edition, John Wiley & Sons, LTD (2005), 3 pages.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.

Leatherdale, C.A., et al., "Photoconductivity in CdSe Quantum Dot Solids," Physical Review B, vol. 62, No. 4, (Jul. 15, 2000) pp. 2669-2680.

Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Sarychev, et al., "Negative refraction metamaterials," Chapter 8 (Wiley 2005).

(56) References Cited

OTHER PUBLICATIONS

Siegel, J. D., "The MSVD Low E 'Premium Performance' Myth," International Glass Review, Issue 1, 2002, pp. 55-58.
Sung, J., et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.
West, J. L., et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.
Zhang, W., Giant optical activity in dielectric planar metamaterials with two-dimensional chirality, Journal of Optics A: Pure and Applied Optics, 8, pp. 878-890 (2006).
Korean Intellectual Property Office as International Searching Authority, International Search Report and Written Opinion for International Application No. PCT/US2008/051959, Jun. 6, 2008, 10 pages.
Korean Intellectual Property Office as International Searching Authority, International Search Report and Written Opinion for International Application No. PCT/US2008/069881, Sep. 30, 2008, 10 pages.
Korean Intellectual Property Office as International Searching Authority, International Search Report and Written Opinion for International Application No. PCT/US2008/087964, Mar. 31, 2009, 12 pages.
Korean Intellectual Property Office as International Searching Authority, International Search Report and Written Opinion for International Application No. PCT/US2009/041576, Nov. 25, 2009, 7 pages.
Notice of Allowance, U.S. Appl. No. 12/019,602, dated Jun. 9, 2010 (now Pat. 7,768,693).
Notice of Allowance, U.S. Appl. No. 12/172,156, dated Mar. 11, 2010 (now Pat 7,755,829).
Notice of Allowance, U.S. Appl. No. 12/843,218, dated Apr. 12, 2011.
Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.
PCT Application No. PCT/US2010/054844.
United States Patent and Trademark Office as International Searching Authority, International Search Report and Written Opinion for International Application No. PCT/US2010/054844, Jul. 28, 2011, 9 pages.

* cited by examiner

THERMOCHROMIC FILTERS AND STOPBAND FILTERS FOR USE WITH SAME

CROSS REFERENCE TO RELATED APPLICATIONS

This application claims the benefit of priority pursuant to 35 U.S.C. §119(e) of U.S. provisional patent application No. 61/256,853 entitled "Infrared stopband filter for use with thermochromic and electrochromic building materials" filed 30 Oct. 2009, which is hereby incorporated herein by reference in its entirety.

This application is also related to the following: U.S. Pat. No. 7,768,693; U.S. Pat. No. 7,755,829; U.S. Patent Application Publication No. 2009/0167971; U.S. Patent Application Publication No. 2008/0210893; and U.S. Patent Application Publication No. 2009/0268273, the disclosures of each are hereby incorporated herein by reference in their entirety.

BACKGROUND

1. Technical Field

The subject matter described herein relates to the design of devices for controlling the flow of light and radiant heat through selective reflection, transmission, and/or absorption and re-emission. The technology has particular, but not exclusive, application in passive or active light-regulating and temperature-regulating films, materials, and devices, especially as construction or building materials.

2. Description of the Related Art

Numerous electrochromic building materials have been developed, such as the electrochromic windows manufactured by Sage Electrochromics and Research Frontiers. In addition, numerous thermochromic building materials have been developed, including the thermoabsorptive and thermoreflective window filters manufactured by RavenBrick LLC. Such systems are often described as "dynamic glazings" or "dynamic windows." Thermochromic and electrochromic materials may also be incorporated into opaque wall panels.

All thermochromic and electrochromic building materials share a number of common traits. First, they all transmit a variable amount of energy in the form of ultraviolet, visible, and near infrared light. Second, they all possess minimum and maximum transmission values in their clear and tinted states. The difference between these two values is sometimes referred to as the "throw." Third, they all possess a minimum and a maximum wavelength over which their variable properties operate. The difference between these two values is called the "bandwidth" of the device, and the values themselves are known as the "band edges." Finally, they all possess one or more wavelength ranges over which they do not operate. Typically the ultraviolet wavelengths are simply blocked to prevent them from damaging the dynamic building material and/or to prevent them from passing through into the building interior. In addition, while it may seem desirable to extend the band edge of a dynamic building material to cover the entire solar spectrum, in practice it becomes increasingly difficult to extend the band edge deep into the infrared, and the benefits of doing so are increasingly sparse as the energy of sunlight peaks at around 460 nanometers and tails off thereafter according to Boltzmann's law.

Thus, a band edge of 1000 nanometers encompasses roughly 73% of the sun's energy and a band edge of 1200 nanometers encompasses roughly 81% of the sun's energy, while a band edge encompassing 99% of the sun's energy does not occur until a wavelength of 4000 nanometers. In practice, this diminishing return means that dynamic building materials rarely exhibit band edges significantly beyond 1200 nm. For purposes of this document, the infrared output of the sun that falls outside the band edge of a dynamic building material shall be referred to as the "unswitched infrared band," and represents a substantial energy resource that is typically wasted.

The information included in this Background section of the specification, including any references cited herein and any description or discussion thereof, is included for technical reference purposes only and is not to be regarded as subject matter by which the scope of the invention is to be bound or limited.

SUMMARY

Combinations of absorptive and reflective filters yielding a thermochromic or thermoreflective filter optimized for desirable combinations of several different variables, including but not limited to cost, return-on-investment, energy savings, human comfort, visible light transmission, and "throw". In one exemplary implementation, a thermochromic filter device has either a thermoabsorptive element or a thermoreflective element operating across one or more regions of spectrum and a passive stopband element operating across one or more overlapping or non-overlapping regions of spectrum. The total energy throughput of the thermochromic filter device is optimized to a desired value for each of a hot state and a cold state.

In another exemplary implementation, a thermochromic filter device has a thermoabsorptive element operating across one or more regions of spectrum and a thermoreflective element operating across one or more overlapping or non-overlapping regions of spectrum. A total energy throughput of the thermochromic filter device is optimized to a desired value for each of a hot state and a cold state.

In a further exemplary implementation, a switchable filter device has a thermoabsorptive element operating across one or more regions of spectrum and a thermoreflective element operating across one or more overlapping or non-overlapping regions of spectrum. A total energy throughput of the switchable filter device is optimized to a desired value for each of a block state and a pass state. The switchable filter device may be photochromatic, electrochromatic, or magnetochromatic.

In yet another exemplary implementation, an optical or infrared stopband filter attenuates solar energy that occurs outside a band edge of a dynamic optical material or device. The stopband filter has a reflective or absorptive property that is mildly attenuating or non-attenuating across a functional bandwidth of the dynamic optical material or device and a reflective or absorptive property that is strongly attenuating across an unswitched solar radiation band of the dynamic optical material or device. An energy throughput and an operating temperature of the dynamic optical material or device are altered. Also a total building energy savings associated with the dynamic optical material or device is improved more than would be by extending a bandwidth of the dynamic optical material across a same region of the solar spectrum.

DETAILED DESCRIPTION

Figure 1:
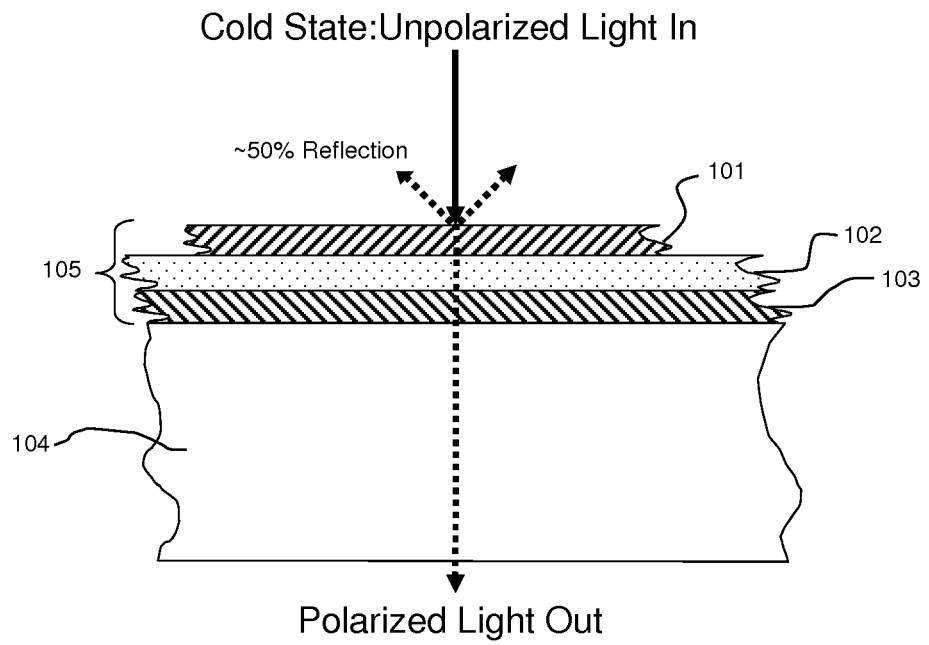
FIG. 1 is a schematic representation of a thermochromic (e.g., thermoreflective) filter laminated to a sheet of glass in its cold, or transparent, state.

FIG. 1 is a schematic representation of an exemplary thermoreflective filter 105 laminated to a sheet of glass 104 in its cold or transparent state. The thermoreflective filter 105 is composed of an outer polarizer layer 101, and inner polarizer layer 103 with a polarity generally perpendicular to the outer polarizer 101, and a liquid crystal layer 102 with a low clearing point temperature between 0° C. and 40° C. When unpolarized light enters the device, it passes through the outer polarizer 101, where up to 50% of the light is reflected because it is of perpendicular polarity to the polarizer 101. The remaining light, with the same polarity as the polarizer, is transmitted through the twisted nematic liquid crystal layer 102, where its polarity is rotated by approximately 90 degrees to match the polarity of the inner polarizer 103. The light is therefore able to propagate through the inner polarizer 103 and thus approximately 50% of the incident light is able to pass through the glass substrate 104. The same principles apply to thermoabsorptive/thermodarkening filters made from absorptive rather than reflective polarizers.

Figure 2:
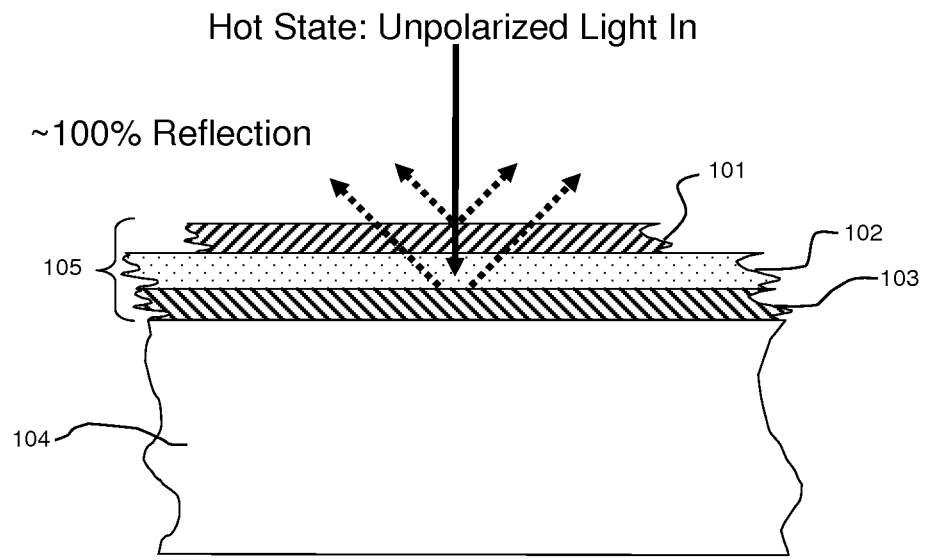
FIG. 2 is a schematic representation of a thermochromic (e.g., thermoreflective) filter laminated to a sheet of glass in its hot, or blocking, state.

FIG. 2 is a schematic representation of the thermoreflective filter 105 laminated to a sheet of glass 104 in its hot or reflective state. When unpolarized light enters the device, it passes through the outer polarizer 101 where approximately 50% of it is reflected because it is of perpendicular polarity to the outer polarizer 101. The remaining light, with the same polarity as the outer polarizer 101, is transmitted through the liquid crystal layer 102. However, because the liquid crystal 102 is above its clearing point temperature, it is in an isotropic or disorganized state rather than an organized state and does not affect the polarity of the light passing through it. The transmitted light is therefore of perpendicular polarity to the inner polarizer 103 and is reflected by the inner polarizer 103, which has a polarity perpendicular to that of the outer polarizer 101. Thus, very little of the incident light is able to pass through the glass substrate 104. Again, the same principles apply to thermoabsorptive/thermodarkening filters made from absorptive rather than reflective polarizers.

FIGS. 1 and 2 are provided for exemplary purposes only, as the methods and devices described herein, and the principles governing them, may be applied to "smart" optical filters of any sort including thermochromic, electrochromic, photochromic, or magnetochromic filters, of either absorptive, reflective, or diffusive varieties, or combinations thereof, that switchably block and pass optical wavelengths. For example, a thermoreflective filter composed of a low-clearing-point liquid crystal sandwiched between two reflective polarizers is disclosed in U.S. Pat. No. 7,755,829, which has particular, but not exclusive, application as a component of building materials, e.g., as a window film. Similarly, in U.S. Patent Application Publication No. 2009/0167971, a thermodarkening filter composed of a low-clearing-point liquid crystal sandwiched between two absorptive polarizers is disclosed, which has particular, but not exclusive, application as a component of building materials, e.g., as a window film.

Figure 3:
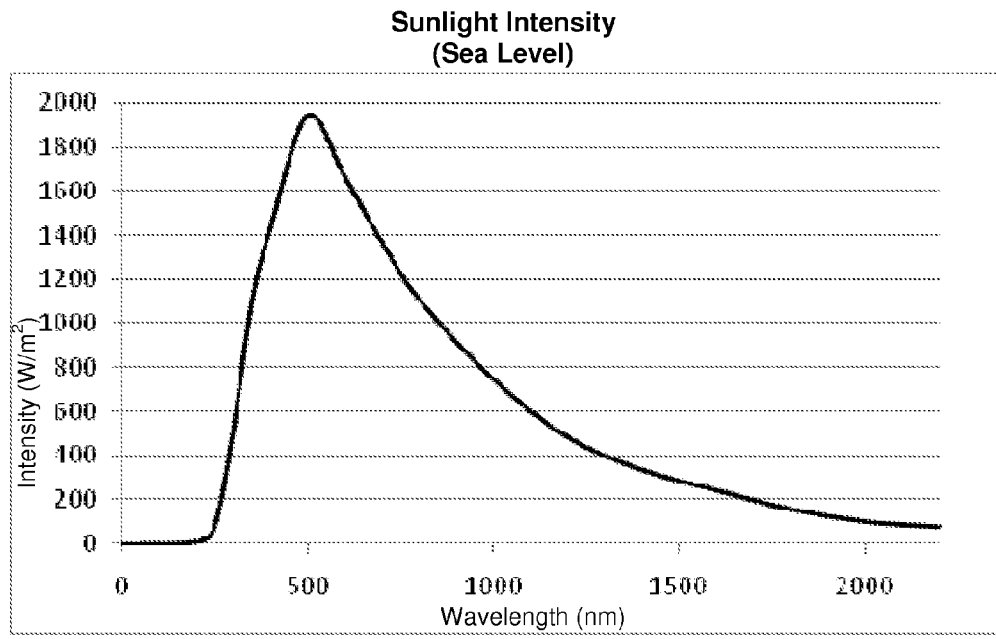
FIG. 3 is a graph showing the sea-level energy output of the sun as a function of wavelength.

FIG. 3 is a graph showing the sea-level intensity of sunlight in Watts per square meter per micrometer as a function of wavelength. Sunlight intensity peaks at around 460 nanometers, corresponding to blue light roughly 21% of the way between ultraviolet and infrared, and tails off thereafter according to Boltzmann's law. Approximately 45% of the energy of sunlight occurs in the visible spectrum (380-750 nm), with another 7% occurring in ultraviolet range (200-370 nm), and 48% occurring in the infrared range (760-4000 nm). The near infrared band from 760-2200 nm contains approximately 43% of the sun's energy and is a primary contributor to solar heat gain in buildings, while contributing no lighting perceptible to the human eye.

Figure 4:
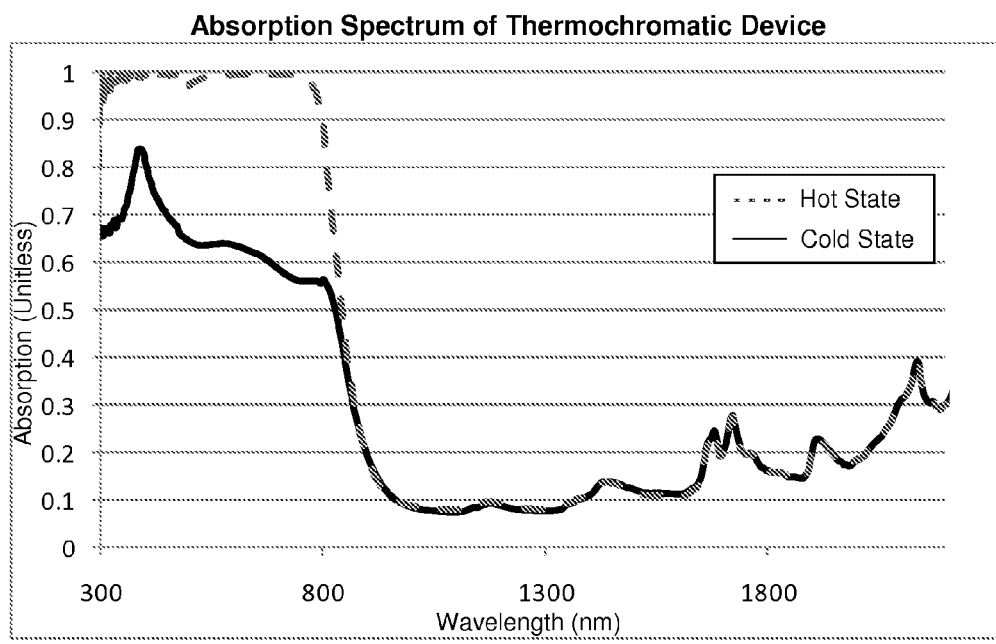
FIG. 4 is a graph representing the absorption spectrum of an exemplary narrowband thermoabsorptive device in its hot and cold states.

FIG. 4 is a graph representing the absorption spectrum of an exemplary thermoabsorptive device in its hot (blocking) and cold (pass through) states. The solid line represents the device in its cold (transparent) state, and the dashed line represents the device in its hot (tinted) state. Such a filter may be constructed using standard absorptive polarizers made from iodine-doped polyvinyl alcohol (PVA) available from a variety of different manufacturers around the world. Because the bandwidth of this device encompasses the entire visible spectrum, but only 7% of the near infrared, its total solar "throw" is approximately 40-45% of what it would be if its band edge were extended to 2200 nm. In addition, because this device is thermoabsorptive rather than thermoreflective, it may absorb a significant amount of energy in direct sunlight. As a result, its operating temperature in direct sunlight may significantly exceed the ambient temperature. This may tend to decrease its operational lifetime, since the chemical reactivity of many organic materials may increase dramatically with temperature. In addition, because the filter is more absorptive in its hot state, and thus absorbs even more solar energy, it may have a tendency to "latch" in the on state while direct sunlight is striking it, even if the ambient temperature drops significantly below the transition temperature of the device.

In addition, in order to maximize energy savings by limiting solar heat gain in hot weather, this device is highly attenuating (~97%) to visible light in its hot state, and in order to maximize "throw" the device is approximately 35% transmissive to visible light in its cold state. This may be acceptable for applications where energy savings are more important than visible light transmission, but may be problematic in applications where large amounts of interior daylight are desired.

Figure 5:
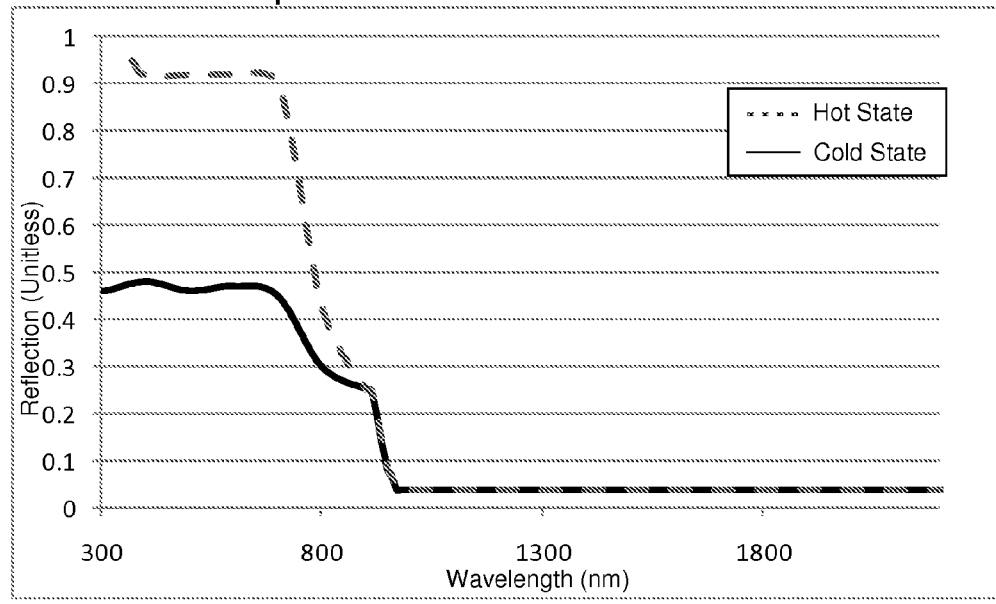
FIG. 5 is a graph representing the reflection spectrum of an exemplary narrowband thermoreflective device in its hot and cold states.

FIG. 5 is a graph representing the reflection spectrum of an exemplary narrowband thermoreflective device, in its hot and cold states. The solid line represents the device in its cold (transparent) state and the dashed line represents the device in its hot (reflective) state. Once again, because the bandwidth of this device encompasses the entire visible spectrum, but only ~7% of the near infrared, its "throw" is approximately 40-45% of what it would be if its band edge were extended to 2200 nm. A device matching these specifications can be made using 3M reflective polarizers in the DBEF family.

Figure 6:
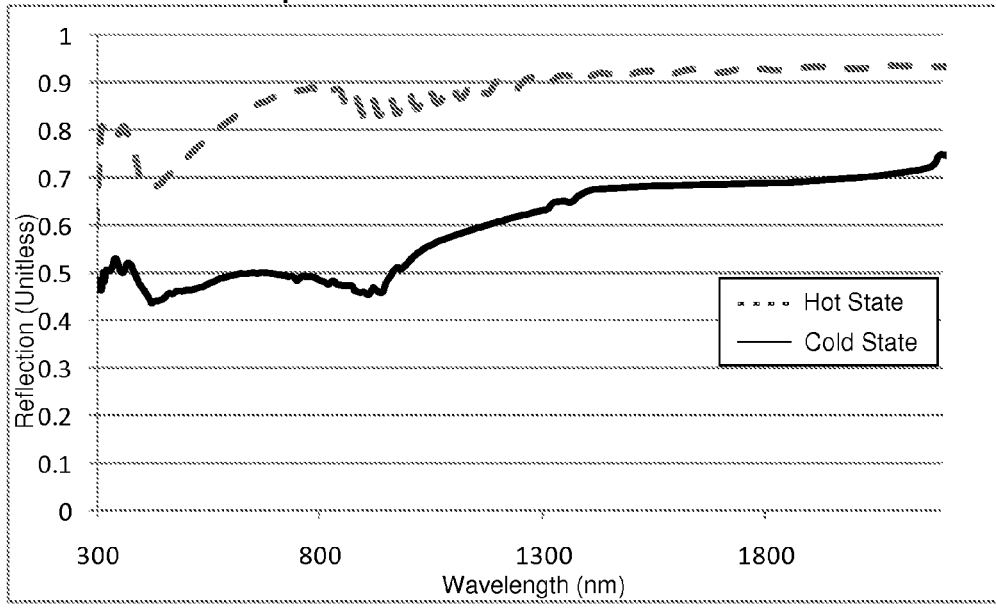
FIG. 6 is a graph representing the reflection spectrum of an exemplary broadband thermoreflective device in its hot and cold states.

FIG. 6 is a graph representing the reflection spectrum of an exemplary broadband thermoreflective device, in its hot and cold states. The solid line represents the device in its cold (transparent) state, and the dashed line represents the device in its hot (reflective) state. In this case, because the bandwidth of the device extends past 2200 nm, the "throw" of the device is much larger than for the exemplary devices of FIGS. 4 and 5. In addition, because the filter is thermoreflective rather than thermoabsorptive, it is generally more efficient at rejecting heat (e.g., when applied to windows in a building or vehicle). A device matching these specifications can be constructed using wire grid polarizers of the type manufactured by Moxtek, Inc.

Because the devices of FIGS. 5 and 6 are highly reflective across the visible spectrum, it should be noted that they may present a zoning problem in some jurisdictions where the reflectivity of windows and other building materials is restricted. For example, many cities in the U.S. set a limit of 20% visible light reflection.

Figure 7:
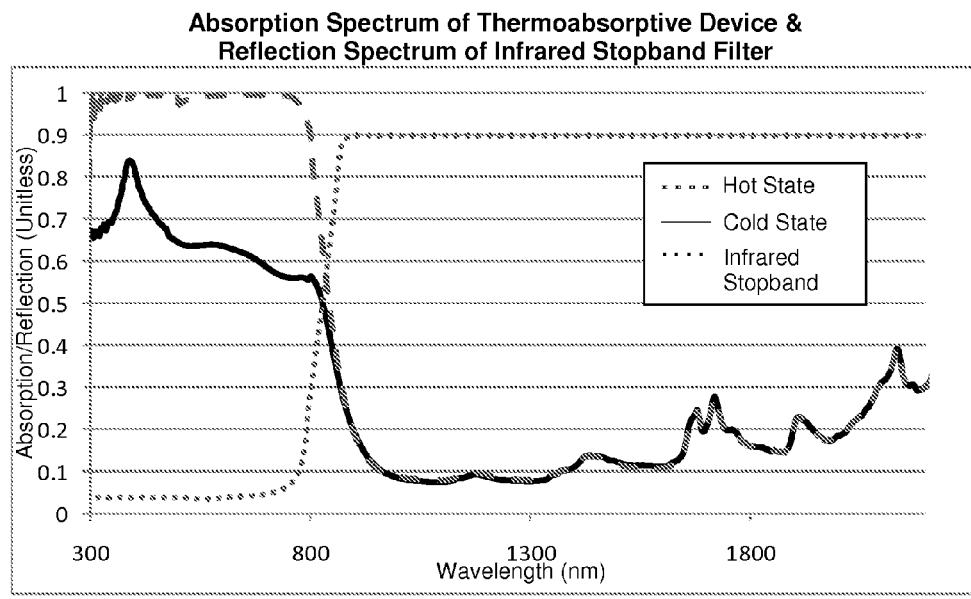
FIG. 7 is a graph representing the absorption spectrum of the exemplary thermoabsorptive device from FIG. 4 plus the reflection spectrum of an infrared stopband filter to be integrated into the device.

FIG. 7 is a graph representing the absorption spectrum of the exemplary thermoabsorptive device from FIG. 4, plus the reflection spectrum of an infrared stopband filter integrated into the device. The addition of the stopband filter does not affect the throw or bandwidth of the device. However, it does reduce the total energy flux through the device by reflecting the majority (in this example, approximately 90%) of solar energy in the near infrared band. In full, direct sunlight, this may also reduce the operating temperature of the device, which may tend to increase its useful lifespan and also make the device more responsive to ambient temperature and less responsive to the heating effects of direct sunlight. This allows greater control over the switching state and thus greater comfort and energy savings in a building material application such as windows and exterior wall panels by, for example, reducing the "latching" effect. Thus, in certain applications—particularly in structures and climate zones primarily needing cooling—this configuration may allow much higher energy savings and comfort ratings than the thermoabsorptive filter by itself.

Figure 8:
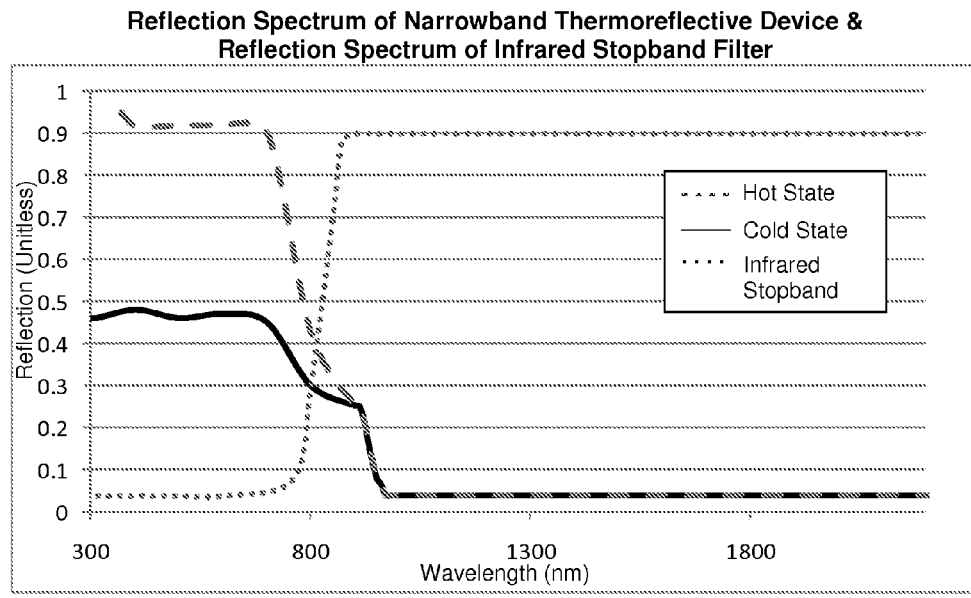
FIG. 8 is a graph representing the reflection spectrum of the exemplary narrowband thermoreflective device from FIG. 5 plus the reflection spectrum of an infrared stopband filter integrated into the device.

FIG. 8 is a graph representing the reflection spectrum of the exemplary narrowband thermoreflective device from FIG. 5, plus the reflection spectrum of an infrared stopband filter integrated into the device. As in the previous example, the addition of the stopband filter does not affect the throw or bandwidth of the device. However, it does reduce the total energy flux through the device by reflecting the majority (in this example, approximately 90%) of solar energy in the near infrared band. Thus, in certain applications—particularly in structures and climate zones primarily needing cooling—this configuration may allow much higher energy savings and comfort ratings than the narrowband thermoreflective filter by itself.

Figure 9:
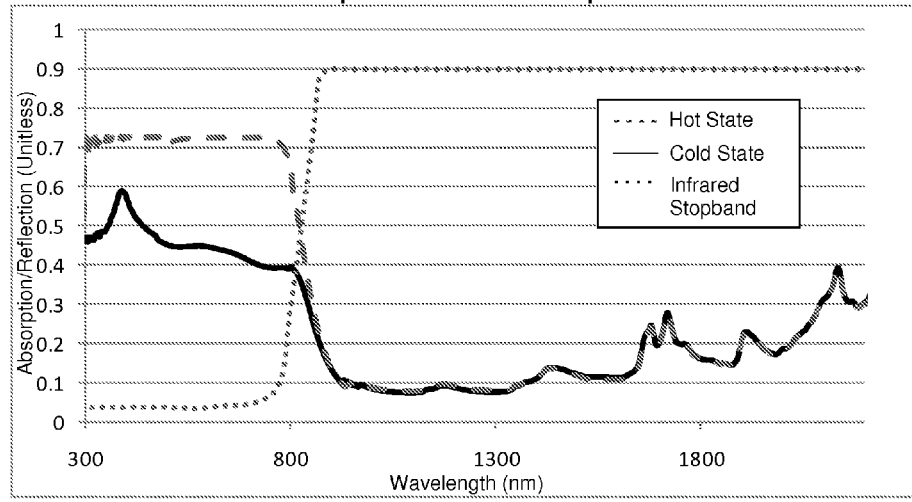
FIG. 9 is a graph representing the absorption spectrum of an exemplary thermoabsorptive device with high visible light transmission plus the reflection spectrum of an infrared stopband filter integrated into the device.

FIG. 9 is a graph representing the absorption spectrum of an exemplary thermoabsorptive device with high visible light transmission, plus the reflection spectrum of an infrared stopband filter integrated into the device. In this case, unlike the exemplary devices of FIGS. 4 and 7, a high transmission of daylight is desired, and some "throw," or control over solar heat gain, is consequently sacrificed. Thus, the device is approximately 45% transmissive to visible light in its cold state and 27% transmissive to visible light in its hot state.

In the case of a polarizing device, this increased transmissivity may be achieved, for example, by reducing the thickness of an iodine-doped polyvinyl alcohol (PVA) layer that is the active polarizing element. This reduces polarization efficiency and contrast ratio, while increasing transmissivity. Myriad other methods may be used to reduce polarization efficiency as well, depending on the exact nature of the polarizer being used. In general, decreasing the efficiency of a polarizer is less difficult than increasing it. Alternatively, the transmissivity in the hot state may be increased by misaligning the polarizers, although this will tend to slightly decrease the transmissivity in the cold state and may thus be a less desirable solution.

Achieving the thermochromic (e.g., thermoabsorptive or thermoreflective) effect through polarization has an added advantage when used in building material applications because the transmission numbers stated above are representative of a polarizing device that is being used to shutter non-polarized light. However, the Earth's sky, as seen from ground level, may include a broad band of highly polarized light approximately 90 degrees away from the sun. At sunrise and sunset, this band may extend from south to north across the zenith of the sky. At noon, it may extend in a circle around the horizon. The blue sky is approximately $\frac{1}{6}^{th}$ as bright as direct sunlight and should be considered a significantly pre-polarizing light source. Thus, if the thermochromic (e.g., thermoabsorptive or thermoreflective) device is oriented such that its polarization in the cold state matches that of the sky, then the filter will appear significantly more transmissive than for an unpolarized light source such as direct sunlight. Thus, in the exemplary device of FIG. 9, the cold-state visible light transmittance may be approximately 54% when looking at the blue sky 90 degrees away from the sun.

Figure 10:
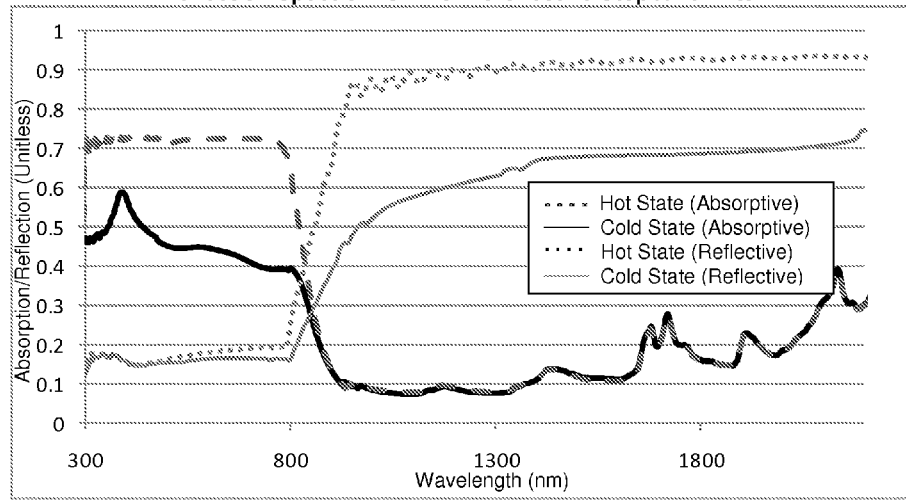
FIG. 10 is a graph representing the absorption spectrum of an exemplary thermoabsorptive device with high visible light transmission plus the reflection spectrum of an exemplary infrared thermoreflective filter integrated into the device.

The same effect works in reverse, i.e., in the hot state the visible light transmission may be as low as 22% when looking at the blue sky approximately 90 degrees away from the sun, because in the hot state the device is polarizing perpendicular to the sky as well as parallel to it. In addition, both effects may be inverted by rotating the device 90 degrees around the vision line, such that the cold-state transmission may drop to approximately 37% and the hot-state transmission may increase to approximately 33%. This very small separation between hot-state and cold-state transmissivity means the device has been effectively neutralized by the polarization of the sky. Thus, the orientation of a polarization-based thermochromic (e.g., thermoabsorptive or thermoreflective) filter can be selected to increase or decrease the "throw" of the device with respect to the blue sky approximately 90 degrees from the sun, and that this orientation sensitivity is an important element of the device's design. These values and geometries are stated here for explanatory purposes only FIG. 10 is a graph representing the absorption spectrum of an exemplary thermoabsorptive device with high visible light transmission, plus the reflection spectrum of an exemplary infrared thermoreflective filter integrated into the device. The device of FIG. 10 does not have any stopband filters, just a thermotropic liquid crystal and two different sets of polarizers (one absorptive and one reflective) covering different ranges of wavelengths. The dashed and solid black lines represent the absorption spectrum of the thermoabsorptive portion of the device in the hot and cold states, respectively, while the dotted and solid gray lines represent the infrared reflection spectrum of the thermoreflective portion of the device in the hot and cold states, respectively.

This configuration allows the switchable bandwidth of the device to be extended all the way to 2200 nm, which may significantly improve its comfort rating and energy savings when used in building material applications such as windows and exterior wall panels. In addition, because the device is thermoreflective in the near-infrared portion of the solar spectrum, it may be extremely efficient at rejecting solar heat gain in its hot state. And because it is thermoabsorptive in the visible spectrum, it is capable of switching on and off a significant portion of the available solar energy without producing high reflectivity that may, in some cases, produce legal or zoning complications.

In addition, the exemplary thermoreflective filter has been configured such that it has a low, but nonzero, polarization efficiency across the visible spectrum, yielding a maximum 20% reflectivity in the hot state. This may allow the energy savings and comfort ratings of the device to be maximized within the constraints of allowable visible-light reflection for some jurisdictions, and within the additional constraint of high visible light transmission in the hot and cold states.

Exemplary devices that achieve thermochromic effects through polarization are described in U.S. Pat. No. 7,755,829 and in U.S. Patent Application Publication No. 2009/0167971. The absorption and reflection effects of such devices may be aligned such that throw and visible light transmission are enhanced, well beyond what is possible with non-polarizing tints. For example, if the absorptive and reflective polarizers are alternated as described, for example, in U.S. Patent Application Publication No. 2009/0268273, then a 20% reflective (80% transmissive) polarizer placed in series with a 45% absorptive (55% transmissive) polarizer at the same polarization alignment yields a net light transmission of approximately 55%, rather than the 36% transmission that would occur if a static, non-polarizing 20% reflector and 45% absorber were placed in series.

Moreover, the stack appears 20% reflective only when seen from the reflective side. When seen from the absorptive side, the light reflecting from the reflective polarizer is largely absorbed by the absorptive polarizer (since their polarization vectors match), so the effective reflection is approximately 6%. Thus, when incorporated into a window with the reflective surface facing outside and the absorptive surface facing inside, the total device in its cold state may be approximately 55% transmissive to visible light, 20% reflective to visible light, and 25% absorptive to visible light from an outside source (e.g., the sun), and 55% transmissive to visible light, 6% reflective to visible light, and 39% absorptive to visible light from an inside source (e.g., a light fixture). Total solar transmission (visible and infrared) for this exemplary device may then be approximately 45% in the cold state and 19% in the hot state, for a throw of 26%. These values are stated for exemplary purposes only.

In addition, for the polarizing form of this exemplary device the same sky polarization effects apply as described above for FIG. 9. Thus, both the throw and the cold-state visible light transmission can be increased if the filter is oriented such that its cold-state polarization axis matches that of the sky. Once again, this is not possible with non-polarizing tints. This performance advantage of polarizing over non-polarizing tints allows reflective and absorptive elements to be combined with very high efficiency, and is explicitly claimed as an embodiment of the present invention.

Figure 11:
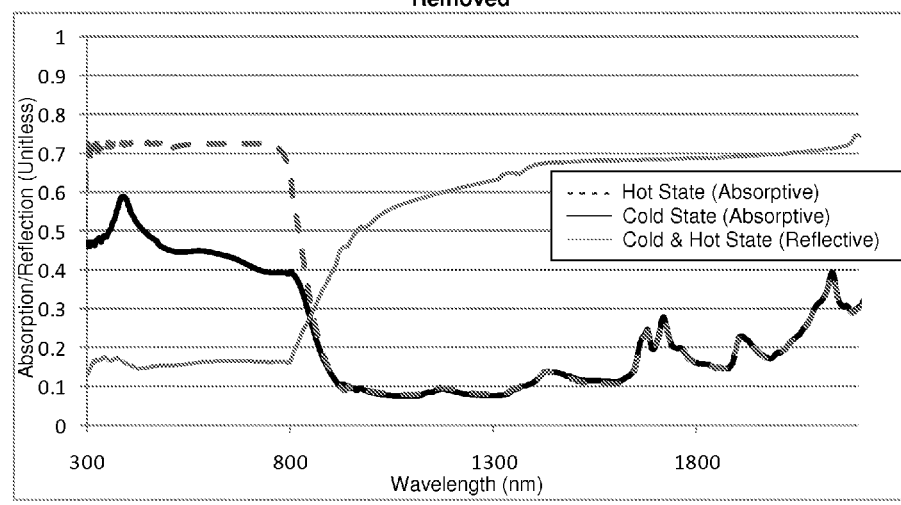
FIG. 11 is a graph representing the same device as FIG. 10, except that one of the infrared reflective polarizers forming the infrared thermoreflective filter has been deleted.

FIG. 11 is a graph representing the same device as FIG. 10, except that one of the two infrared reflective polarizers has been removed. Thus, the device is approximately 50% reflective to near-infrared wavelengths in both its hot and cold states. This allows a lower overall solar heat gain coefficient than the thermoabsorptive filter alone, while preserving the zoning compliance and visible light transmission characteristics of the embodiment in FIG. 10. In addition, it may be less expensive to manufacture than the embodiment of FIG. 10, because it contains fewer polarizing layers. However, in the visible light wavelengths there is much greater light transmission than if a non-polarizing 20% reflective layer were used instead of a 20% reflective polarizer, and in the region of overlap between the bandwidths of the visible-light absorptive polarizers and the infrared reflective polarizer, there is much greater light transmission in the cold state than would be possible if a non-polarizing, 50% reflective layer were used instead.

Figure 12:
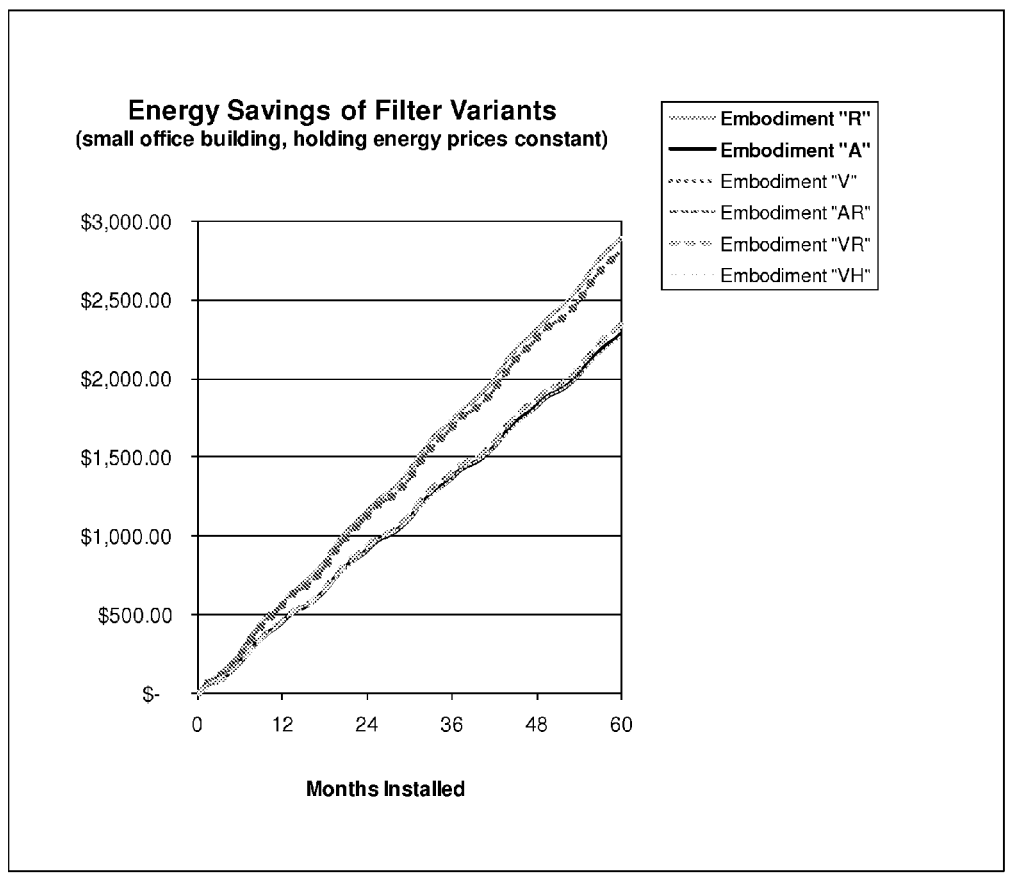
FIG. 12 is a graph showing the energy savings for various embodiments of the present invention in an exemplary building and climate zone.

FIG. 12 is a graph showing the energy savings for various exemplary embodiments of the present invention, in an exemplary building and climate zone. Embodiment "R" corresponds to the exemplary device of FIG. 6, a broadband thermoreflective filter configured for modest visible light transmission and large "throw." Embodiment "A" corresponds to the exemplary device of FIG. 4, a thermoabsorptive filter operating primarily in the visible spectrum, configured for low visible light transmission and large "throw." Embodiment "V" corresponds to the exemplary device of FIG. 10, a visible-light thermoabsorptive and infrared thermoreflective filter which is configured for high visible light transmission, modest visible light reflection, and large "throw." Embodiment "VR" corresponds to the exemplary device of FIG. 9, a thermoabsorptive filter operating primarily in the visible spectrum, configured for high visible light transmission and with an infrared stopband filter to reduce solar heat gain coefficient. Embodiment "VH" corresponds to the exemplary device of FIG. 11, a visible-light thermoabsorptive filter configured for high visible light transmission with an infrared polarizer to reduce solar heat gain coefficient.

This graph indicates that all of these exemplary devices show roughly comparable energy savings in an exemplary building and climate zone, but that they achieve such energy savings through very different combinations of absorption, reflection, and transmission, both static and switchable, and in both the visible and near-infrared spectrum. Thus, energy savings can be traded off against other properties that may be desirable for particular applications including, but not limited to, visible light transmission, visible light throw, total solar throw, shading of direct sunlight, peak heating and cooling loads, and various human comfort metrics.

Figure 13:
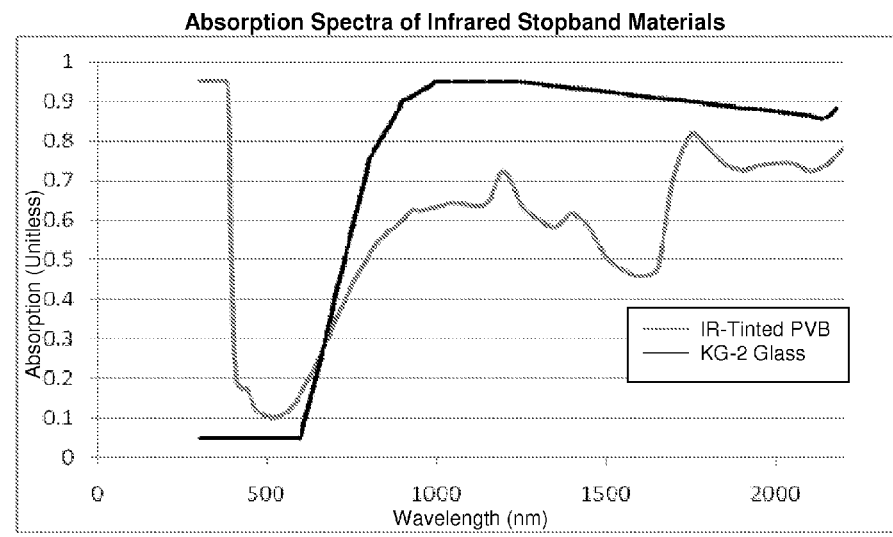
FIG. 13 is a graph showing the absorption spectra of two different materials that are suitable for use as absorptive infrared stopband filters.

FIG. 13 is a graph showing the absorption spectra of two different materials that are suitable for use as absorptive infrared stopband filters for the exemplary dynamic building material of FIG. 4. These exemplary embodiments are passive filters that operate on the unswitched infrared band outside a dynamic building material's band edge (i.e., the near infrared band not affected by the thermochromic material that switches with a temperature threshold), for the purpose of maximizing the energy performance of that material without extending its bandwidth.

The solid gray line represents an infrared-tinted PVB film called "8.6 Green/.090 SGP/Clear" produced by Cardinal Glass Industries, which exhibits roughly 80-90% transmission across the functional bandwidth of the dynamic building material and approximately 70% absorption across the unswitched infrared band. The solid black line represents an even better (though more costly) infrared stopband filter material: KG-2 glass from Schott, which exhibits roughly 95% transmission across the functional bandwidth of the dynamic building material and roughly 95% absorption across the unswitched infrared band of the dynamic building material. Because the KG-2 spectrum begins absorbing where the dynamic building material's absorption band stops, an infrared stopband filter made of KG-2 is particularly well suited to "plugging the hole" and preventing transmission of solar energy from 900 to 2200 nanometers. If the infrared stopband filter is integral to, adjacent to, or otherwise in thermal contact with the dynamic building material (e.g., through conduction, convection, or radiative heat transfer), this configuration will also have the effect of raising the internal temperature of the dynamic building material and thus driving it more toward its "hot state" behavior (e.g., greater tinting) for the purpose of increasing the overall energy savings of the system.

The two materials described for use as infrared stopband filters are described here for exemplary purposes. A large plurality of other materials, or combinations of materials, could be used to create almost any desired absorption spectrum across the functional bandwidth and the unswitched infrared band of a dynamic building material.

It is generally assumed that extending the band edge of a dynamic building material will improve its energy-saving capabilities, since the material is then capable of switching a greater percentage of the sun's energy on or off. However, this view presumes that the response of the material is not altered by the throughput of additional energy. In practice, transmitting the unswitched infrared band into the building interior raises the building temperature, which may alter the behavior of building occupants, thermostats, mechanical systems, automated control systems for dynamic materials, and autonomous behavior of so-called "smart" materials. Absorbing the unswitched infrared band raises the temperature of the dynamic window system which, in the case of a thermochromic system, will increase the level of tinting; in the case of a thermoreflective system, will increase the amount of reflection; and in the case of an electrochromic system, may trigger automated responses from the electrochromic control system. Further, reflecting the unswitched infrared band lowers the amount of absorbed energy and thus lowers the temperature of the dynamic building material, with similarly nonlinear effects on system performance, and also lowers the amount of solar heat gain within the building and thus alters the behavior of people and systems within the building.

Therefore, the result (which may be counterintuitive) is that extending the band edge of a dynamic building material may decrease, rather than increase, the total energy savings of the building over time. This result depends primarily on the exact nature and setpoints of the dynamic building material. However, it also depends on the building type, size, orientation, climate zone, window-to-wall ratio, surrounding landscape, HVAC system, thermostat control algorithms, and occupant behavior. The only reliable methods for assessing the total-building energy performance of dynamic materials are (a) live testing, and (b) detailed building simulation.

The former is problematic because long test times (in general, a year or more) are required to evaluate the performance of different materials and setpoints across all seasons. Thus, trade studies could reasonably take decades to unfold, or require the testing of large numbers of similar buildings. Therefore, while live testing plays an important role in the validation of particular designs, it is generally an adjunct to large numbers of computer simulations that are used to find optimal combinations of materials and setpoints.

This simulation process has been facilitated by the U.S. Department of Energy's Lawrence Berkely National Laboratory, which has produced a suite of standardized software tools and building models that can be used to evaluate different materials, or different dynamic setpoints for the same material, under rigorously controlled and easily reproducible conditions, across an entire model year, in multiple building types and climate zones, over a period of hours or days as opposed to the years required for live testing. For example, Window 6, Optics 5, EnergyPlus 3.0, and the TMY weather file database have been used for this purpose with extremely effective results, although other software tools and data files may be used to produce similar results.

Through such modeling, it has been determined that under some conditions (generally identified through computer simulation, although closed-form theoretical calculations may serve the same purpose) it may be desirable to control the unswitched infrared band in one of three specific ways: total absorption, total reflection, or total transmission. This can be accomplished with an infrared filter, which may be a separate material layer within the dynamic building material, may be external to the dynamic building material, or may take the form of a dopant, dye, or additive to one or more layers within the dynamic building material. The result is a device for increasing the energy savings of a dynamic building material without extending its bandwidth. For the purposes of this document, such a filter is referred to herein as an "infrared stopband filter."

It is undesirable for such control of the unswitched infrared band to interfere with the dynamic properties of the dynamic building material across its functional bandwidth. Thus, the infrared stopband filter should have relatively constant response across the dynamic building material's functional bandwidth. In many cases, it will be desirable for the absorption or reflection of the infrared stopband filter to be zero, or near zero, across the functional bandwidth of the dynamic material. In other cases, it may be desirable for the infrared stopband filter to have some other absorption or reflection property (e.g., 50%) across the functional bandwidth of the dynamic building material in order to raise or lower the operating temperature of the dynamic building material in full sunlight.

In either case, the infrared stopband filter may have a reflection or absorption property that rises sharply, to a high value (e.g., 100% or some close approximation thereof), at the band edge of the dynamic building material. For example, Raven Brick's RavenWindow™ window filter product has a large "throw" across its bandwidth between 300 and 900 nanometers, but does not switchably affect the transmission of radiation past the band edge at around 900 nanometers. An exemplary infrared stopband filter for use in conjunction with the RavenWindow™ window filter product may have an extremely low (e.g., <10%) reflection or absorption between 300 and 900 nanometers, a sharply rising reflection or absorption at around 900 nanometers, and a very large reflection or absorption (e.g., >90%) across the "unswitched infrared" band from 900 to 2200 nanometers.

In practice, very sharp band edges and very large transmission differences are difficult to achieve with absorptive materials. However, reasonable approximations do exist. For example, G. James Corporation of Australia manufactures a PVB film called HL5P19 that is approximately 30% absorptive across the visible spectrum, has increasing absorption between 700 and 900 nanometers, is approximately 70% absorptive between 900 and 1700 nanometers, and then rises to approximately 90% absorption between 1700 and 2200 nanometers. This film has a slight blue tint, but is nevertheless acceptable for use as an infrared stopband filter to enhance the energy-saving properties of a dynamic building material. Similarly, the U.S. company Cardinal Glass Industries produces a PVB film called "8.6 Green/.090 SGP/Clear" that is approximately 10% absorptive to visible light, with absorption increasing linearly between 600 and 900 nanometers to a value of 65% absorption, which then remains relatively constant out to 2200 nanometers. This material has a very slight green tint, similar to the color of ordinary float glass, and is also suitable for use as an infrared stopband filter to enhance the energy savings of dynamic building materials.

Numerous infrared pigments also exist. Ferro Corporation's Color Division produces an inorganic infrared pigment called "iron chromite infrared black." BASF makes Sicomix brand infrared pigments, which include both organic and inorganic components. Keystone Aniline Corporation of Chicago, Ill. manufactures infrared pigments such as Keysorb 970 and Keysorb 1026 whose absorption peak centers in nanometers are specified in the product names. Other infrared pigments are available from Polatechno, Sanritz, Arisawa, Nippon Kayaku, and Sumitomo and have mainly been used in the manufacture of infrared polarizers. When such dyes are used in sufficient quantity to block a substantial majority (e.g., greater than 90%) of infrared light within a particular wavelength band, they are often significantly attenuating to visible light as well.

However, other materials exist that absorb infrared light while being highly transparent to visible light. For example, Schott corporation makes "heat absorbing glass" (for example, KG-1, KG-2, KG-5, BG-18, BG-38, BG-9, and VG-9) that is >90% transmissive to visible light and >99% absorbing to infrared radiation beyond approximately 800 nm. For many of these materials the transmissivity rises to approximately 80% again by 1750 nanometers, but only approximately 8% of the sun's energy occurs beyond this wavelength. Thus, the Schott glass can be used to make fairly precise infrared stopband filters that do not significantly interfere with visible light transmission, and are thus extremely suitable for enhancing the energy-saving properties of dynamic building materials. However, while the KG glass is colorless in the visible spectrum, Schott's BG and VG materials have band edges that lend a blue, green, or violet tint, which may be acceptable for some applications and problematic for others.

Thus, different organic and inorganic materials can be combined to produce close to 100% absorption within a given range of infrared wavelengths (e.g., the unswitched infrared band of a dynamic building material), while allowing close to 100% transmission of visible light and near-infrared light with wavelength shorter than the desired band edge. Alternatively, the approximately 100% absorption of a specified band of infrared light may be accompanied with some specific amount of visible light transmission that is selected to optimize the energy-saving properties of the thermochromic building material as described above.

The situation is even more favorable with regard to reflective infrared stopband filters. Unlike the absorption spectra of infrared-absorbing materials, the reflection spectra of optical materials often have sharp, sudden, and clearly defined band edges that occur at precise wavelengths, and also extremely high transmission values outside their reflection bands. Thus, it is fairly straightforward to design bandblock reflectors, bandpass reflectors, and shortpass reflectors with band edges occurring at any desired wavelength. Types of reflective filters that can serve this purpose include distributed Bragg reflectors, Rugate filters, cholesteric liquid crystals, dichroic coatings, and other known interference-type coatings. There are also pigments having bright reflection spectrums in the wavelengths of concern (so-called "infrared white" materials). There are also materials that are highly transparent to visible light and highly reflective to infrared, such as tin oxide, which is less than 10% reflective to visible light, but more than 90% reflective to long-wavelength infrared. In addition, the transmissivity of a given material may be enhanced in the visible spectrum, or any other desired range of wavelengths, by introducing periodic openings into the material of appropriate size and spacing to allow those wavelengths to pass preferentially, as described for example in U.S. Patent Application Publication No. 2009/0128893.

Thus, different optical materials, combinations of materials, and microstructures can be combined to produce close to 100% reflection within a given range of infrared wavelengths (e.g., the unswitched infrared band of a dynamic building material) while allowing close to 100% transmission of visible light, and near-infrared light with wavelengths shorter than the desired band edge. Alternatively, the approximately 100% reflection of a specified band of infrared light may be accompanied with some specific amount of visible light transmission that is selected to optimize the energy-saving properties of the thermochromic building material as described above.

In other embodiments, reflective and absorptive properties can be combined, either in a single layer or in two or more separate layers, to produce an infrared stopband filter that has specific combinations of absorption and reflection (e.g., 50% absorption and 50% reflection) that are intended to optimize the performance of dynamic building materials in the unswitched infrared band outside their switchable bandwidth. Such combinations may be even more effective if they are polarizing rather than non-polarizing, as detailed above, although non-polarizing embodiments may also be efficacious.

Figure 14:
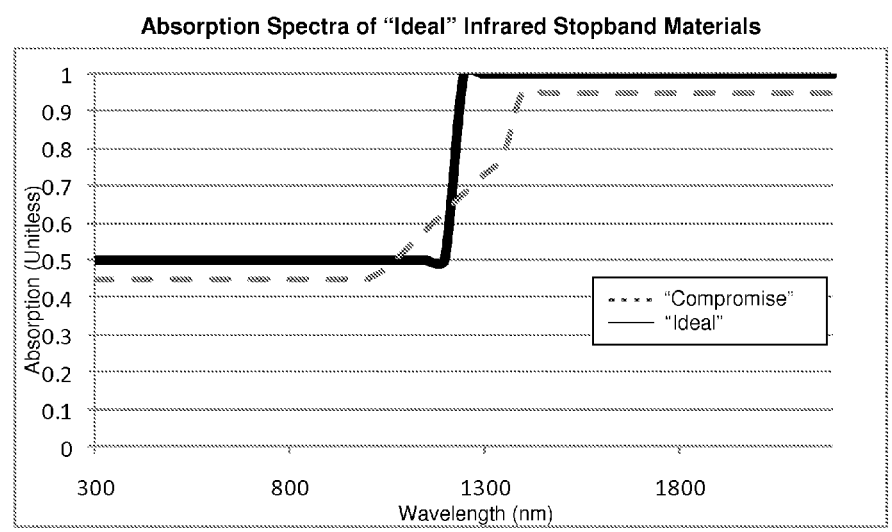
FIG. 14 is a graph showing the absorption spectrum of an ideal absorptive infrared stopband filter.

FIG. 14 is a graph showing the absorption spectra of two exemplary infrared stopband filters designed to work with a dynamic, thermochromic or thermotropic building material whose band edge occurs at roughly 1200 nanometers (as opposed to the 900 nanometers of the exemplary dynamic building material of FIG. 2), and which has a fairly shallow tint-vs.-temperature curve (as opposed to the abrupt tint-vs.-temperature curve of the exemplary dynamic building material of FIG. 2). Such specifications may be achieved using a guest-host liquid crystal cell as described for example in U.S. Patent Application Publication No. 2010/025968. Alternatively, a film or coating containing one or more types of thermochromic pigment molecules may be used instead, as described for example in U.S. Pat. No. 6,084,702 to Byker et al. Both of these devices may be largely or completely non-polarizing, although polarizing versions of them could also be created.

The solid line on FIG. 14 represents the "ideal" absorption spectrum for this particular "smart" optical filter, wherein the infrared stopband filter absorbs approximately 50% of the light across the dynamic building material's functional bandwidth and approximately 95% of the light across the dynamic building material's unswitched infrared band. The dashed line represents a "compromise" material wherein the band edge of the infrared stopband filter is more gradual, and the absorption is smaller across the dynamic building material's functional bandwidth and also across its unswitched infrared band. These exemplary infrared stopband filters result in greater absorption of solar energy, and thus a higher operating temperature, and result in higher performance for the thermochromic building material (as measured by total building energy consumption over the course of a model year) than extending the band edge of the thermochromic building material to 2200 nanometers. In other words, the addition of this a stopband filter with these specifications is better, in terms of energy performance, than improving the infrared performance of the smart filter itself. This result (which may seem counterintuitive) has been confirmed through building simulations of the said thermochromic or thermotropic building material.

Figure 15:
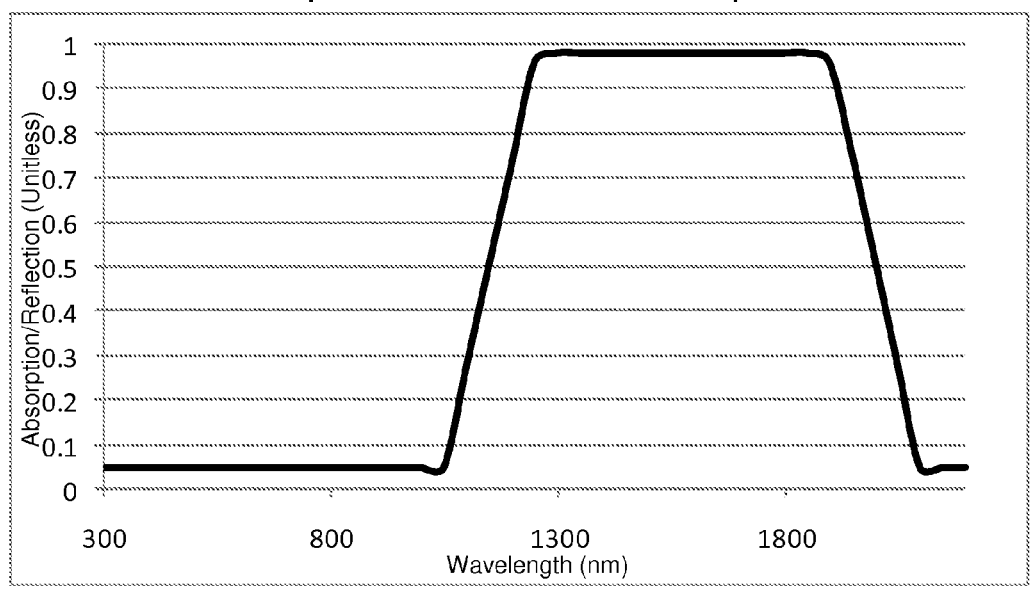
FIG. 15 is a graph showing the reflection spectrum of a representative reflective infrared stopband filter.

FIG. 15 is a graph showing the reflection spectrum of an exemplary, reflective infrared stopband filter designed to work, for example, with a thermoreflective building material having a band edge around 1200 nanometers. This reflection spectrum closely resembles that of the "Extended Hot Mirror" dichroic coating available from Quik-Mod optics, although its spectrum is shifted roughly 200 nm deeper into the infrared through an alteration of the dichroic properties of the coating. This exemplary reflective infrared stopband filter increases the total reflection of energy from the thermoreflective building material, thus lowering both its own operating temperature and the internal temperature of the building. Under some circumstances (e.g., in hot climates, in skylights, and in large buildings with a high window-to-wall ratio), this results in higher performance of the thermoreflective building material than extending the band edge of the thermoreflective building material to 2200 nanometers. This result, although counterintuitive, has been confirmed through building simulations and live tests of the thermochromic building material incorporating such a reflective infrared stopband filter.

Although these embodiments have been described with particular detail, these embodiments are described here for exemplary purposes, and that a plurality of other combinations of reflection, absorption, and transmission may be implemented without departing from the scope of the present disclosure. In addition, numerous additional variations and optional enhancements can be applied. For example, the addition of a low-emissivity coating may have significant effects on the energy and comfort performance of any of the stated embodiments. Alternatively, although reflective infrared stopband filters are employed in the exemplary devices described above, absorptive infrared stopband filters, or a combination of absorptive and reflective infrared stopband filters, could be used as well.

The exact arrangement of the various layers can be different than is disclosed herein and, depending on the materials and wavelengths selected, different layers can be combined as single layers, objects, devices, or materials, without altering the essential structure and function of the invention. For example, the infrared stopband filter could double as a structural element or could be integrated directly into the dynamic building material. Alternatively, the dynamic building material need not have a single operational bandwidth or a single unswitched radiation band, but could have multiple such bands spread across the solar spectrum, with each "hole" in the spectrum potentially being "plugged" by a different stopband filter. The band edges of an infrared stopband filter, whether reflective or absorptive, may be either gradual or sharp without altering the basic nature of the present invention.

Also, the bandwidth of the stopband filter or filters may occur in, or overlap with, the visible spectrum. In addition, the absorption and reflection spectra of multiple filters or filter components may be combined to produce particular color effects, including the "colorless" state of clear or neutral gray. Methods for designing "metameric" colors from individual spectral peaks are well described.

Furthermore, although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. All directional references (e.g., proximal, distal, upper, lower, inner, outer, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other. Stated percentages of light transmission, absorption, and reflection shall be interpreted as illustrative only and shall not be taken to be limiting. Changes in detail or structure may be made without departing from the basic elements of the invention as defined in the following claims.

What is claimed is:

1. A thermochromic filter device comprising
   either a thermoabsorptive element or a thermoreflective element operating across a first wavelength region to block electromagnetic radiation in a hot state and pass through electromagnetic radiation in a cold state, the first wavelength region being bounded at an upper end by a first band edge; and
   a passive stopband element operating across a second electromagnetic wavelength region to block electromagnetic radiation, wherein
   at least a portion of second wavelength region is above the first band edge;
   the total energy passed through the thermochromic filter device is optimized to a desired value for each of the hot state and the cold state.

2. The thermochromic filter device of claim 1, wherein the passive stopband element is reflective.

3. The thermochromic filter device of claim 1, wherein the passive stopband element is absorptive.

4. The thermochromic filter device of claim 1, wherein the either the thermoabsorptive element or the thermoreflective element is constructed with one or more polarizers.

5. The thermochromic filter device of claim 4, wherein an orientation of the thermochromic filter device is selected to aligns with a polarization of the sky in order to maximize visible light transmission and throw.

6. The thermochromic filter device of claim 1, wherein a reflection spectrum of the passive stopband element exceeds 20% reflectivity across the visible spectrum.

7. The thermochromic filter device of claim 1, wherein a reflection spectrum of the passive stopband element does not exceed 20% reflectivity across the visible spectrum.

8. The thermochromic filter device of claim 1, wherein
   the thermoabsorptive element or the thermoreflective element operates within an optical spectrum; and
   the stopband element operates within a near-infrared spectrum.

9. A thermochromic filter device comprising
  a thermoabsorptive element operating across a first wavelength region to block electromagnetic radiation in a hot state and pass through electromagnetic radiation in a cold state, the first wavelength region being bounded at an upper end by a first band edge; and
  a thermoreflective element operating across a second wavelength region to block electromagnetic radiation in the hot state and pass through electromagnetic radiation in the cold state, wherein
  a total energy passed through the thermochromic filter device is optimized to a desired value for each of the hot state and the cold state.

10. The thermochromic filter device of claim 9, wherein the either the thermoabsorptive element or the thermoreflective element is constructed using polarizers.

11. The thermochromic filter device of claim 10, wherein an orientation of the thermochromic filter device is selected to align with a polarization of the sky in order to maximize visible light transmission and throw.

12. The thermochromic filter device of claim 9, wherein a reflection spectrum of the thermoreflective element exceeds 20% reflectivity across the visible spectrum.

13. The thermochromic filter device of claim 9, wherein a reflection spectrum of the thermoreflective element does not exceed 20% reflectivity across the visible spectrum.

14. The thermochromic filter device of claim 9, wherein
  the thermoabsorptive element operates within an optical spectrum; and
  the thermoreflective element operates within a near-infrared spectrum.

15. The thermochromic filter device of claim 9, wherein at least a portion of second wavelength region is above the first band edge.

16. A switchable filter device comprising
  a thermoabsorptive element operating across a first wavelength region to block electromagnetic radiation in a block state and pass through electromagnetic radiation in a pass state, the first wavelength region being bounded at an upper end by a first band edge; and
  a thermoreflective element operating across a second wavelength region to block electromagnetic radiation in the hot state and pass through electromagnetic radiation in the cold state, wherein
  a total energy passed through the switchable filter device is optimized to a desired value for each of the block state and the pass state.

17. The switchable filter device of claim 16, wherein the switchable filter device further comprises a photochromic filter combined therewith.

18. The switchable filter device of claim 16, wherein the switchable filter device further comprises a magnetochromic filter combined therewith.

19. The switchable filter device of claim 16, wherein the switchable filter device further comprises an electrochromic filter combined therewith.

20. The switchable filter device of claim 16, wherein at least a portion of second wavelength region is above the first band edge.

21. A switchable filter device comprising
  an absorptive element operating across a first wavelength region to block electromagnetic radiation in a block state and pass through electromagnetic radiation in a pass state, the first wavelength region being bounded at an upper end by a first band edge; and
  a reflective element operating across a second wavelength region to block electromagnetic radiation in the block state and pass through electromagnetic radiation in the pass state, wherein
  a total energy passed through the switchable filter device is optimized to a desired value for each of the block state and the pass state.

22. The switchable filter device of claim 21, wherein the switchable filter device further comprises a thermochromic filter combined therewith.

23. The switchable filter device of claim 21, wherein the switchable filter device further comprises an electrochromic filter combined therewith.

24. The switchable filter device of claim 21, wherein the switchable filter device further comprises a photochromic filter combined therewith.

25. The switchable filter device of claim 21, wherein the switchable filter device further comprises a magnetochromic filter combined therewith.

26. The switchable filter device of claim 21, wherein at least a portion of second wavelength region is above the first band edge.

* * * * *